A. McRONALD.
Brake for Children's Carriages.

No. 221,336.  Patented Nov. 4, 1879.

WITNESSES:
F. McArdle.
C. Sedgwick.

INVENTOR:
A. McRonald
BY Munn & Co.
ATTORNEYS.

UNITED STATES PATENT OFFICE.

ALEXANDER McRONALD, OF TORONTO, ONTARIO, CANADA, ASSIGNOR TO HIMSELF AND GEORGE DINGWALL, OF SAME PLACE.

IMPROVEMENT IN BRAKES FOR CHILDREN'S CARRIAGES.

Specification forming part of Letters Patent No. 221,336, dated November 4, 1879; application filed April 22, 1879.

*To all whom it may concern:*

Be it known that I, ALEXANDER McRONALD, of Toronto, in the Province of Ontario, Dominion of Canada, have invented a new and useful Improvement in Brakes for Children's Carriages, of which the following is a specification.

Figure 1:
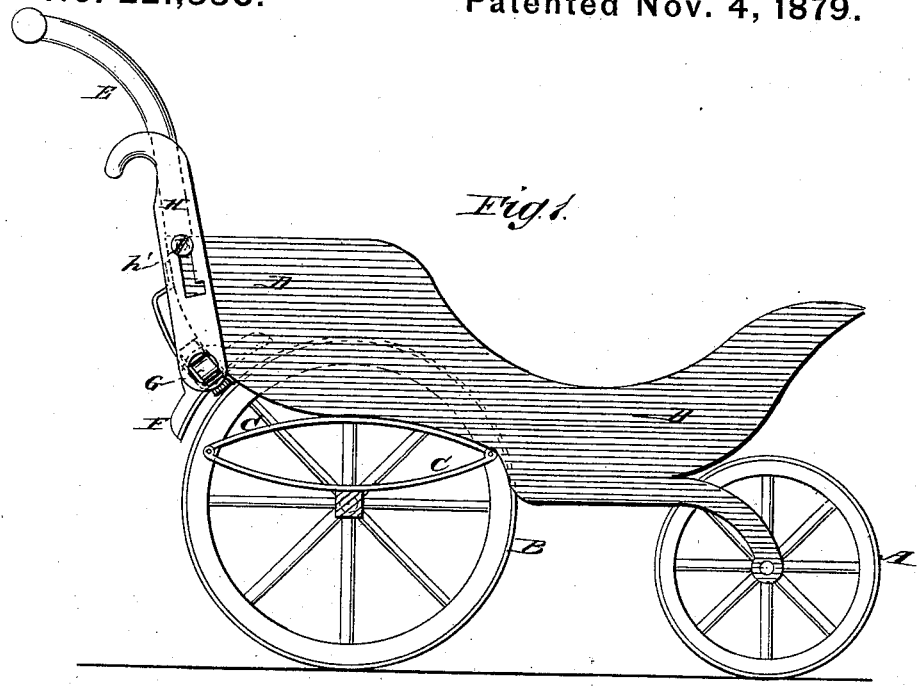
Figure 2:
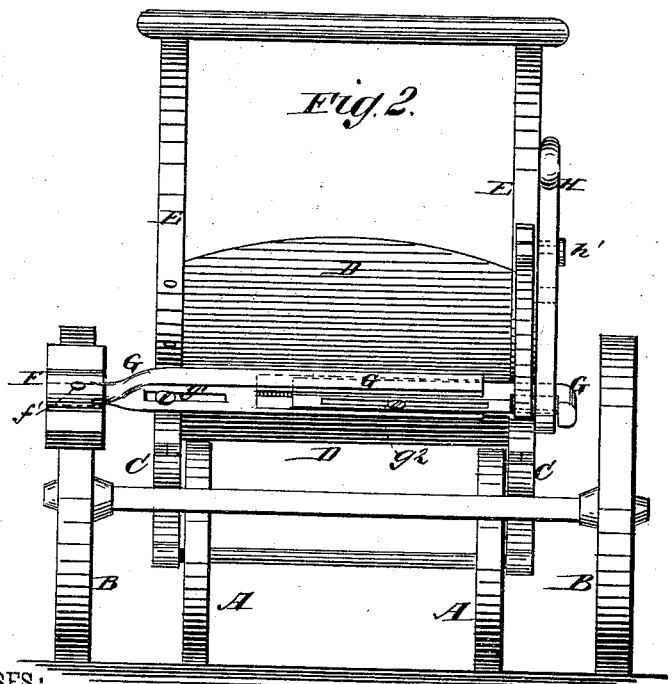

Figure 1 is a side view of a child's carriage to which my improvement has been applied. Fig. 2 is a rear view of the same.

The object of this invention is to furnish an improved brake for children's carriages, which shall be simple in construction, readily applied, and reliable in use, holding the carriages securely in place, preventing them from moving when left alone, and holding them stationary while the children are being put in and taken out.

The invention consists in a brake for a child's carriage, formed of the adjustable brake-shoe, the pivoted brake-bar, and the handle and its locking-screw; and in a brake for a child's carriage, in which the brake-bar is slotted to receive the pivoting-screw, and is made in two parts, sliding upon each other, and secured, when adjusted, by a screw, as hereinafter fully described.

Similar letters of reference indicate corresponding parts.

A represents the forward wheels, B the rear wheels, C the springs, D the body, and E the handles, of a child's carriage, about the construction of which parts there is nothing new.

F is the brake-shoe, which may be made of leather, rubber, wood, or other suitable material or materials, and which is secured to the end of the brake-bar G adjustably by a screw, $f'$. The brake-bar G is pivoted to the back of the body or handle of the carriage by a screw, $g'$. To the other end of the brake-bar G is attached the lower end of a handle, H, which passes up along the side of the handle E, and is slotted longitudinally to receive a screw, $h'$, attached to the handle E. In the handle H, at the side of its longitudinal slot, are formed one or more cross-slots to receive the screw $h'$, and lock the brake in position when applied.

To adapt the brake to be applied to different styles of carriages the brake-bar G is slotted longitudinally to receive the pivoting-screw $g'$, so that it may be adjusted to carriages with the wheels at different distances from the body. For the same purpose the brake-bar G is made in two parts, sliding upon each other, and secured to each other, when adjusted, by a screw, $g^2$.

In the drawings one of the parts of the bar G is represented as being slotted or grooved longitudinally, and the other part so formed as to fit into and slide in the said slot or groove.

If desired, one of the parts may be made tubular, and the other so formed as to fit into it. In any case the bar G must be so formed as to be rigid when its parts are secured to each other.

Having thus fully described my invention, I claim as new and desire to secure by Letters Patent—

1. A brake for a child's carriage, formed of the adjustable brake-shoe F, the pivoted brake-bar G, and the handle H and its locking-screw $h'$, substantially as herein shown and described.

2. A brake for a child's carriage, in which the brake-bar G is slotted to receive the pivoting-screw, and is made in two parts, sliding upon each other, and secured, when adjusted, by a screw, $g^2$, substantially as herein shown and described.

ALEXANDER McRONALD.

Witnesses:
 PRYCE MOTHAM,
 THOMAS HILL.